(12) United States Patent
Yoneda et al.

(10) Patent No.: US 6,719,089 B2
(45) Date of Patent: Apr. 13, 2004

(54) ELECTRIC POWER STEERING APPARATUS

(75) Inventors: Atsuhiko Yoneda, Wako (JP); Masanori Takagi, Wako (JP); Yasuo Shimizu, Wako (JP); Takashi Kuribayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/314,056

(22) Filed: Dec. 4, 2002

(65) Prior Publication Data
US 2003/0106738 A1 Jun. 12, 2003

(30) Foreign Application Priority Data

Dec. 6, 2001 (JP) ........................................ 2001-373382

(51) Int. Cl.[7] ................................................ B62D 5/04
(52) U.S. Cl. ............................ 180/446; 701/41; 701/43
(58) Field of Search ................................ 180/443, 446; 701/41–43

(56) References Cited

U.S. PATENT DOCUMENTS 6,274,999 B1 * 8/2001 Fujii et al. .................. 318/807
6,554,303 B2 * 4/2003 Benz et al. ................. 280/93.5
6,577,957 B2 * 6/2003 Fujimoto et al. ............. 702/36

* cited by examiner

*Primary Examiner*—Lesley D. Morris
*Assistant Examiner*—L. Lum
(74) *Attorney, Agent, or Firm*—Merchant & Gould, P.C.

(57) ABSTRACT

In en electric power steering apparatus, a motor controller unit controls PWM driving of a brushless motor for imparting a steering torque assist, on the basis of output signals of at least a steering torque detector section, motor current detector section and rotational angle detector section that includes a resolver. Either one of a predetermined frequency of the PWM driving and predetermined exciting frequency of the resolver is set to be an integral multiple of the other of the predetermined PWM driving frequency and the predetermined exciting frequency.

2 Claims, 7 Drawing Sheets

ELECTRIC POWER STEERING APPARATUS

FIELD OF THE INVENTION

The present invention relates generally to electric power steering apparatus, and more particularly to an improvement in electric power steering apparatus for motor vehicles which impart power of an electric motor to a vehicle's steering system to reduce a necessary manual steering effort of a human vehicle operator or driver.

BACKGROUND OF THE INVENTION

Various electric power steering apparatus for motor vehicles are known, in which an electric motor is driven under control of a motor controller unit, on the basis of signals output by a steering torque detector section detecting a steering torque applied to a steering wheel and a vehicle velocity detector section detecting a velocity of the vehicle, so as to reduce a necessary manual steering effort of a human operator. Among the known electric power steering apparatus is one employing a brushless motor for generating a steering torque assist.

The electric power steering apparatus employing a brushless motor can afford a stable steering assist force, because the absence of voltage drops between a brush and a commutator can prevent reduction and variation in motor output power. Further, since the brushless motor presents a smaller moment of inertia than the brush motor, the electric power steering apparatus with such a brushless motor can afford a good steering feel during high-speed straight travel or turning of a steering wheel.

However, with the electric power steering apparatus employing the brushless motor, it is necessary to control an electric current to be supplied to the motor in accordance with a current rotational angle of the motor. Thus, it has been conventional for the electric power steering apparatus to include a rotational detector section for detecting a current rotational angle of the motor and a motor-current detector section, so that the brushless motor is driven in accordance with PWM (Pulse Width Modulation) control on the basis of detection signals output from the rotational detector section and motor-current detector section.

Figure 5:
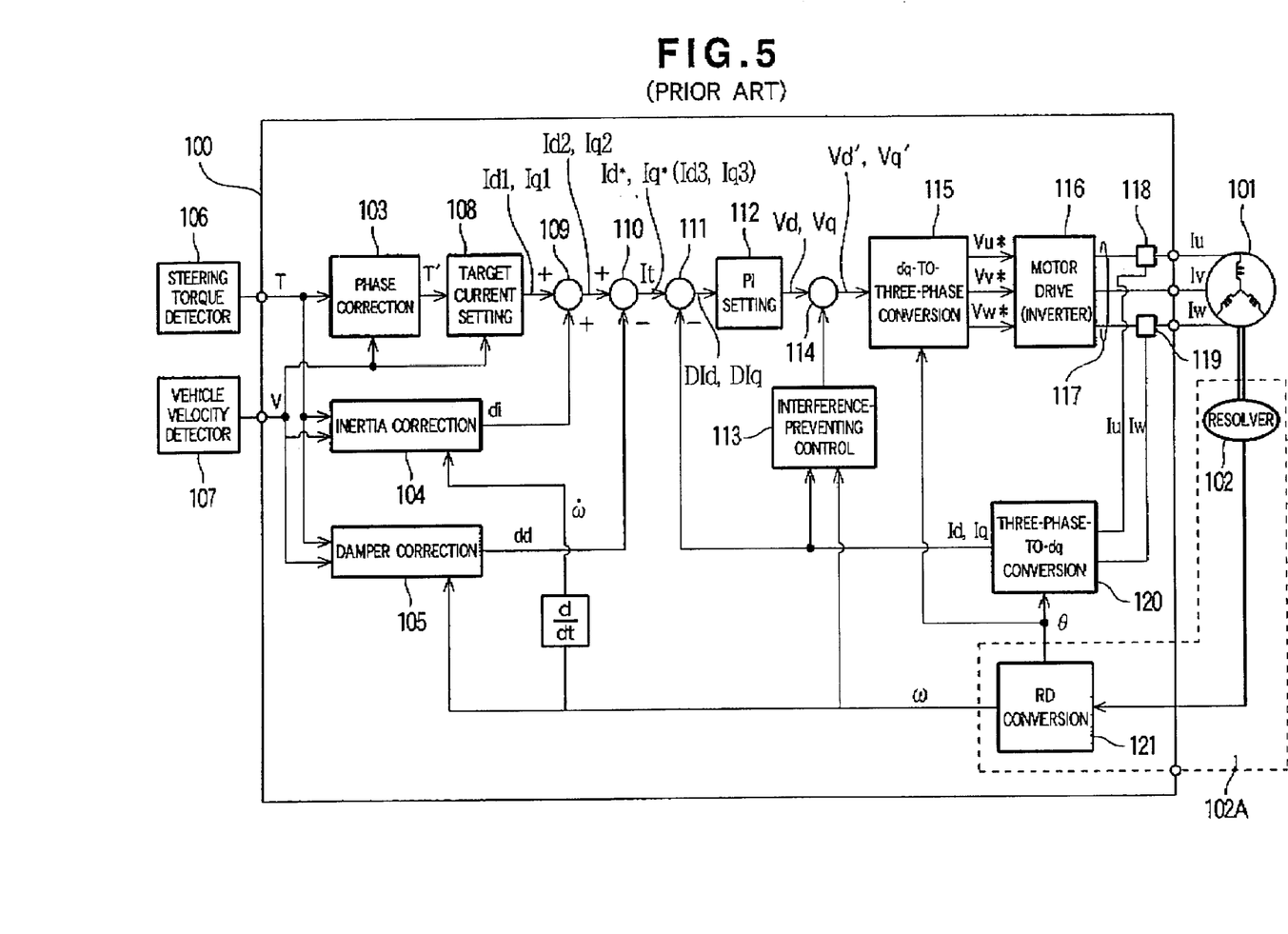
FIG. 5 is a block diagram showing a motor controller unit in a conventional electric power steering apparatus.

FIG. 5 is a block diagram showing the rotor controller unit for controlling the rotation of the brushless motor. To the brushless motor 101 is connected a VR (variable Reluctance)-type resolver 102 for detecting a current rotational angle of the brushless motor 101.

The motor controller unit 100 for controlling the rotational angle of the brushless motor 101 includes a phase correction section 103, inertia correction section 104 and damper correction section 105.

The phase correction section 103 of the motor controller unit 100 corrects the phase of a steering torque signal T supplied from a steering torque detector section 106 on the basis of a vehicle velocity signal v from a vehicle velocity detector section 107, so as to output an corrected steering torque signal T' to a target current setting section 108. The inertia correction section 104 generates an inertia correcting signal di, on the basis of the steering torque signal T from the steering torque detector section 106, vehicle velocity signal v from the vehicle velocity detector section 107 and angular-velocity-corresponding signal generated by a differentiation processing section 12Id differentiating a signal corresponding to a rotational angular velocity ω of a rotor of the motor, outputs the thus-generated inertia correcting signal di to an adder section 109. The damper correction section 105 generates a damper correcting signal dd on the basis of the steering torque signal T from the steering torque detector section 106, vehicle velocity signal v from the vehicle velocity detector section 107 and signal corresponding to the rotational angular velocity ω of the rotor. The damper correction section 105 outputs the thus-generated damper correcting signal dd to a subtracter section 110.

The target current setting section 108 calculates two-phase target currents Id1 and Iq1 on the basis of the corrected steering torque signal T' output from the phase correction section 103 and vehicle velocity signal V. The target currents Id1 and Iq1 correspond to a "d" axis and "q" axis intersecting with the "d" axis on a rotational coordinate system synchronized with a rotational magnetic flux produced by a permanent magnet on the rotor of the brushless motor 101. Hereinafter, these target currents Id1 and Iq1 will be referred to as a "d-axis target current" and "q-axis target current", respectively.

The adder section 109 adds the d-axis target current and q-axis target current Id1 and Iq1 with the inertia correcting signal di, to thereby output inertia-corrected target currents Id2 and Iq2. The subtracter section 110 subtracts the damper correcting signal dd from the inertia-corrected target currents Id2 and Iq2, to thereby output damper-corrected target currents Id3 and Iq3. Hereinafter, these damper-corrected target currents Id3 and Iq3 will be referred to as a "final d-axis target current" Id* and "final q-axis target current" Iq*, respectively.

The final d-axis target current Id* and final q-axis target current Iq* are passed to an offset calculation section 111, which subtracts d-axis and q-axis detected currents Id and Iq from the final d-axis and q-axis target currents Id* and Iq*, respectively, to thereby calculate offsets DId and DIq and then outputs the thus-calculated offsets DId and DIq to a PI (Proportional and Integral) setting section 112.

The PI setting section 112 performs arithmetic operations using the offsets DId and DIq, to thereby calculate d-axis and q-axis target voltages Vd and Vq such that the d-axis and q-axis detected currents Id and Iq follow the final d-axis target current Id* and final q-axis target current Iq*, respectively. The d-axis and q-axis target voltages Vd and Vq are corrected, via an interference-preventing control section 113 and arithmetic section 114, to d-axis and q-axis corrected target voltages Vd' and Vd' that are then delivered to a dq-to-three-phase conversion section 115.

Only one set of the adder section 109, subtracter section 110, offset calculation section 111, PI setting section 112 and arithmetic section 114 are shown in FIG. 5 for purposes of clarity; in practice, however, two separate sets of these sections 109, 110, 111, 112 and 114 are provided for the two target currents Id1 and Iq1.

The interference-preventing control section 113 calculates interference-preventing control correction values for the d-axis and q-axis target voltages Vd and Vq, on the basis of the d-axis and q-axis detected currents Id and Iq and rotational angular velocity ω of the rotor.

The arithmetic section 114 subtracts the respective interference-preventing control correction values from the d-axis and q-axis target voltages Vd and Vq, to thereby calculate d-axis and q-axis corrected target voltages Vd' and Vq' that are output to the dq-to-three-phase conversion section 115.

The dq-to-three-phase conversion section 115 converts the d-axis and q-axis corrected target voltages Vd' and Vq' to three-phase target voltages Vu*, Vv* and Vw* and outputs the thus-converted three-phase target voltages Vu*, Vv* and Vw* to a motor drive section 116.

The motor drive section 116 includes a PWM-controlled voltage generation section and inverter circuit (both not shown). The motor drive section 116 generates, by means of the not-shown PWM-controlled voltage generation section, PWM-controlled voltage signals UU, VU and WU corresponding to the three-phase target voltages Vu*, Vv* and Vw*, and it outputs these PWM-controlled voltage signals UU, VU and WU to the not-shown inverter circuit. Then, the inverter circuit generates three-phase A.C. driving currents Iu, Iv and Iw corresponding to the PWM-controlled voltage signals UU, VU and WU, which are supplied via three-phase driving current paths 117 to the brushless motor 101. The three-phase A.C. driving currents Iu, Iv and Iw are each a sine-wave current for driving the brushless motor 101 on the basis of the PWM control (i.e., PWM driving of the brushless motor 101).

Motor current detector sections 118 and 119, which are provided on two of the three-phase driving current paths 117, detect two driving currents Iu and Iw among the three-phase A.C. driving currents Iu, Iv and Iw to be supplied to the brushless motor 101 and outputs the detected driving currents Iu and Iw to a three-phase-to-dq conversion section 120. In turn, the conversion section 120 calculates the remaining driving current Iv on the basis of the detected driving currents Iu and Iw, and it converts these three-phase A.C. driving currents Iu, Iv and Iw into d-axis and q-axis detected currents Id and Iq.

Signals sequentially generated by the resolvers 102 are supplied in succession to an R/D (resolver/digital) conversion section 121. The R/D conversion section 121 calculates an angle (rotational angle) θ of the rotor relative to the stator of the brushless motor 101 and then supplies the dq-to-three-phase conversion section 115a and three-phase-to-dq conversion section 120 with a signal corresponding to the calculated rotational angle θ. Further, the R/D conversion section 121 calculates a rotational angular velocity ω of the rotor relative to the stator of the brushless motor 101 and then supplies the damper correction section 105, differentiation processing section 121d and interference-preventing control section 113 with a signal corresponding to the calculated rotational angular velocity ω. The VR-type resolver 102 and RD conversion section 121 together constitute a rotational detector section 102A for detecting a rotational angle of the brushless motor 101.

Figure 6:
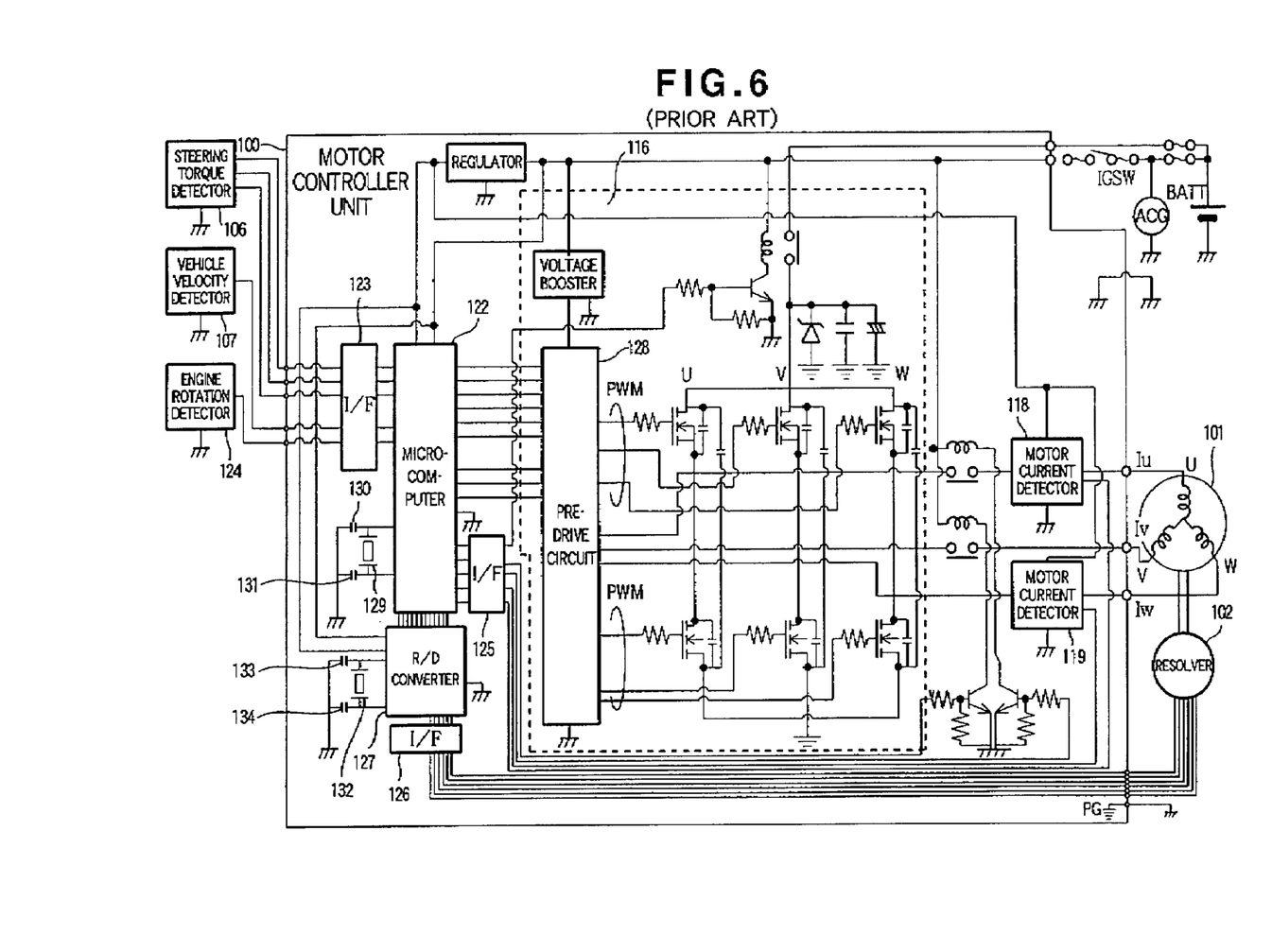
FIG. 6 is a block diagram showing a general setup of a motor controller unit employed in the conventional electric power steering apparatus of FIG. 5.

As illustrated in FIG. 6, all the components, except for the various sensors and inverter circuit, of the motor controller unit 100 are incorporated in an electronic circuitry unit, and in fact, the motor controller unit 100 is implemented by a microcomputer 122; that is, the respective functions of the components are performed by processing based on software programs.

In FIG. 6, an interface circuit 123 includes an A/D converter that converts, into digital representation, the steering torque signal T from the steering torque detector section 106, vehicle velocity signal v from the vehicle velocity detector section 107 and engine rotation signal r from an engine rotation detector section 124. The digital signals thus converted in the interface circuit 123 are passed to the microcomputer 122.

Another interface circuit 125 converts, into digital representation, the driving currents Iu and Iw detected by the motor current detector sections 118 and 119 and delivers the thus-converted digital signals to the microcomputer 122. Still another interface circuit 126 passes an exciting current from an R/D converter 127 to the resolver 102 and an output signal of the resolver 102 to the R/D converter 127. As will be described later, the R/D converter 127 generates an angle signal on the basis of the output signal of the resolver 102 and sends the thus-generated angle signal to the microcomputer 122. The motor drive section 116 includes a pre-drive circuit 128 and an inverter circuit having six power FETs.

External crystal oscillator 129 and capacitors 130 and 131 are connected to the microcomputer 122, and the microcomputer 122 divides an oscillation frequency of the crystal oscillator 129 to generate a frequency $f_{PWM}$ of PWM signals for driving the brushless motor 101 (hereinafter also called a "PWM driving frequency").

Further, a crystal oscillator 132 and capacitors 133 and 134 are connected to the R/D converter 127, and the R/D converter 127 divides an oscillation frequency of the crystal oscillator 132 to generate a frequency $f_{RES}$ of exciting signals to be sent to the resolver 102.

Generally, in order to provide an electric power steering apparatus capable of affording a smooth steering feel, smooth outputs of a brushless motor are required. For this purpose, the motor controller unit may perform vector control on the brushless motor on the basis of the output signals of the motor rotation detector section and motor current detector as set forth above and supplies sine-wave currents to the brushless motor as motor currents so that the motor produces outputs with small torque variations.

Specifically, the sine-wave currents are supplied to the brushless motor via the motor drive (inverter) section composed of switching elements, such as FETs, and peripheral circuits associated therewith. Such switching elements are driven at the PWM driving frequency $f_{PWM}$ beyond the audible range and thereby supplies driving power to the brushless motor 101.

Further, because the vector control requires detection of an absolute rotational angle of the brushless motor 101, the electric power steering apparatus includes a rotational detector section, such as a resolver, for detecting a rotational angle, angular velocity, angular acceleration, etc. of the motor 10. The resolver detects gap variations of an iron core of the rotor to thereby detect a rotational angle of the motor.

Figure 7:
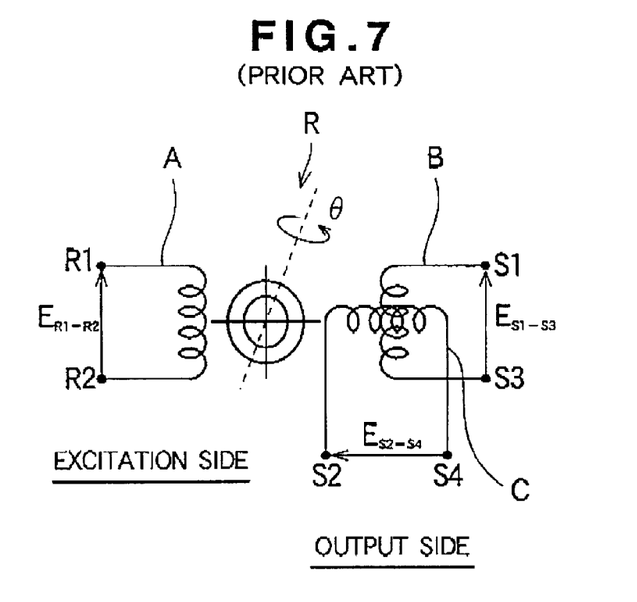
FIG. 7 is a diagram explanatory of operating principles of a resolver.

FIG. 7 is a diagram explanatory of the operating principles of the resolver. Coil A is provided adjacent to one side of the rotor R as an exciting coil, while coils B and C are provided adjacent to the opposite side of the rotor R as two output coils forming a right angle therebetween. Magnetic field produced by a current flowing through the energizing coil A flows in the output coils B and C. With the current varying over time, an inductive electromotive force is produced in the output coils B and C in accordance with the Faraday's law of electromagnetic induction.

Namely, a voltage of an angular frequency $\omega_E$ as represented by Mathematical Expression (1) below is applied to terminals R1 and R2 of the energizing coil A, as single-phase excitation.

$E_{R1-R2} = E \sin \omega_E t$                                        Mathematical Expression (1)

Thus, when the rotor R is at an angle θ, a voltage as represented by Mathematical Expression (2) below is output from terminals S1 and S3 of the output coil B while a voltage as represented by Mathematical Expression (3) is output from terminals S2 and S4 of the output coil C.

$E_{s1-s3} = KE \sin \omega_E t \times \cos \theta$                           Mathematical Expression (2)

$E_{s2-s4} = KE \sin \omega_E t \times \sin \theta$                           Mathematical Expression (3)

Figure 8:
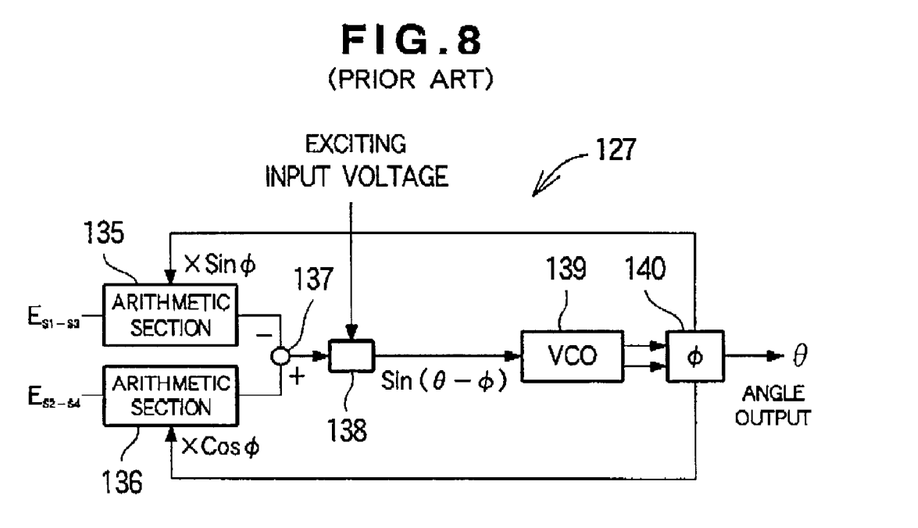
FIG. 8 is a block diagram explanatory of R/D converting principles of an R/D converter.

FIG. 8 is a block diagram explanatory of the RD conversion principles of the R/D converter 127. The voltage $E_{s1-s3}$ input to the R/D converter 127 is supplied to an arithmetic section 135, which calculates a product between the input voltage $E_{s1-s3}$ and a sine value of an angle φ (sin φ) stored in an internal ROM. Similarly, the voltage $E_{s2-s4}$ input to the R/D converter 127 is supplied to another arithmetic section 136, which calculates a product between the input voltage $E_{s2-s4}$ and a cosine value of the angle φ stored in the internal ROM. Then, an arithmetic section 137 determines a difference D1 as represented by Mathematical Expression (4) below.

$$D1 = E_{s2-s4} \times \cos\phi - E_{s1-s3} \times \sin\phi \quad \text{Mathematical Expression (4)}$$
$$= KE\sin\omega_E t \times (\sin\theta\cos\phi - \cos\theta\sin\phi)$$

The thus-determined difference D1 is modified as represented Mathematical Expression (5) below.

$$D1 = KE \sin \omega_E t \times \sin(\theta-\phi) \quad \text{Mathematical Expression (5)}$$

Synchronized detector section 138 detects a signal indicative of the difference d1 in synchronism with an exciting input voltage, so that a signal D2 as represented Mathematical Expression (6) below is output from the synchronized detector section 138.

$$D2 = \sin(\theta-\phi) \quad \text{Mathematical Expression (6)}$$

The signal D2 (sin(θ−φ)) is passed to a VCO (Voltage-Controlled Oscillator) section 139 and counter 140, which output an angle θ by increasing or decreasing the value of the angle θ such that the signal D2 always takes a zero value.

In short, a single-phase input voltage is excited by the sine wave represented by Mathematical Expression (1), and two-phase (sine and cosine) output voltages, modulated with the sine and cosine waves represented by Mathematical Expression (2) and Mathematical Expression (3), are obtained. Then, the two-phase outputs are subjected to the above-mentioned R/D conversion to thereby provide an angle output. Here, the exciting frequency $f_{RES}$ is approximately 10 kHz.

In this case, if switching noise caused by the PWM driving is introduced in the outputs of the resolver, the outputs of the R/D converter 127 will present variations corresponding to a difference between the PWM driving frequency $f_{PWM}$ and the exciting frequency $f_{RES}$ (f1=$f_{PWM}$−$f_{RES}$) or difference between respective harmonics (higher-order frequency components) of the PWM driving frequency $f_{PWM}$ and the exciting frequency $f_{RES}$ (f2=n×$f_{PWM}$−m×$f_{RES}$ where n=1, 2, . . . , m=1, 2, . . . ). As a consequence, the outputs of the brushless motor too will present variations corresponding to the frequency difference f1 (Hz) or f2 (Hz). In the conventional motor controller unit of FIG. 6, such output variations would result for the following reason even if the PWM driving frequency $f_{PWM}$ and exciting frequency $f_{RES}$ are set to be identical to each other.

Namely, in the conventional motor controller unit of FIG. 6, the frequency $f_{PWM}$ of the PWM signal (i.e., PWM driving frequency $f_{PWM}$) is generated by the microcomputer 122 dividing the oscillation frequency of the crystal oscillator 129, and the frequency $f_{RES}$ of the exciting voltage (i.e., exciting frequency $f_{RES}$) is generated by the R/D converter 127 dividing the oscillation frequency of the crystal oscillator 132. Because the PWM driving frequency $f_{PWM}$ and exciting frequency $f_{RES}$ are generated on the basis of two separate crystal oscillators, there would be caused variations in load capacitance due to individual differences etc. between the crystal oscillators 129 and 132 and between the capacitors 130, 131 and 133, 134. Thus, even if two crystal oscillators of stable frequencies are employed, there would be caused a frequency difference between signals generated from the two different crystal oscillator circuits. For this reason, it has been difficult to make the PWM driving frequency $f_{PWM}$ and exciting frequency $f_{RES}$ exactly identical to each other. Therefore, the R/D converter 127 produces considerable variations in its outputs, which would lead to undesired variations or fluctuations in the steering assist force imparted by the brushless motor 101. The variations in the steering assist force would cause vibrations of the steering wheel, thereby significantly impairing the steering feel.

SUMMARY OF THE INVENTION

In view of the foregoing prior art problems, it is an object of the present invention to provide an electric power steering apparatus of a type employing a brushless motor where there occurs no impairment of a steering feel due to wear and tear of a motor brush and moment-of-inertia of a motor rotor and which can afford a smooth steering feel with minimized variations in the steering assist force by reducing variations in the output power of the brushless motor.

In order to accomplish the above-mentioned object, the present invention provides a n electric power steering apparatus which comprises: a steering torque detector section for detecting steering torque applied to a steering wheel; a brushless motor for imparting a steering torque assist to a steering system; a rotational angle detector section for detecting a rotational angle of the brushless motor, the rotational angle detector section including a resolver; a motor current detector section for detecting a current supplied to the brushless motor; and a motor controller unit for controlling PWM driving of the brushless motor at a predetermined PWM driving frequency, on the basis of output signals of at least the steering torque detector section, rotational angle detector section and motor current detector section. In this electric power steering apparatus, one of the predetermined PWM driving frequency and the predetermined exciting frequency of the resolver is set to be an integral multiple of the other of the predetermined PWM driving frequency and the predetermined exciting frequency.

Because one of the predetermined PWM driving frequency at which the brushless motor is driven and the predetermined exciting frequency of the resolver is set to be an integral multiple of the other, the difference between the PWM driving frequency $f_{PWM}$ and the exciting frequency $f_{RES}$ (i.e., f1=$f_{PWM}$−$f_{RES}$) or the difference between respective harmonics (higher-order frequency components) of the PWM driving frequency $f_{PWM}$ and the exciting frequency $f_{RES}$ (i.e., f2=n×$f_{PWM}$−m×$f_{RES}$ where n=1, 2, . . . , m=1, 2, . . . ) can be 0 Hz, or the difference f1 or f2 can be an integral multiple of the exciting frequency $f_{RES}$. Thus, the outputs from the R/D conversion section and brushless motor present no substantial variation, so that variation-free steering assist force can be applied to the steering wheel. As a result, the present invention can afford a smooth steering feel.

In a preferred implementation, the electric power steering apparatus employs a same oscillator for generating predetermined signals, and both the PWM driving of the brushless motor and excitation of the resolver are performed in accordance with the output signals of the same oscillator in such a manner that one of the predetermined PWM driving frequency and the predetermined exciting frequency of the resolver is set to be an integral multiple of the other of the predetermined PWM driving frequency and the predetermined exciting frequency. Because the predetermined PWM driving frequency $f_{PWM}$ at which the brushless motor is driven and the predetermined exciting frequency exciting frequency $f_{RES}$ of the resolver are generated on the basis of the output signals of the same oscillator and one of the predetermined PWM driving frequency and the predetermined exciting frequency of the resolver is set to be an integral multiple of the other, the difference between the PWM driving frequency $f_{PWM}$ and the exciting frequency $f_{RES}$ (i.e., $f1=f_{PWM}-f_{RES}$) or the difference between respective harmonics (higher-order frequency components) of the PWM driving frequency $f_{PWM}$ and the exciting frequency $f_{RES}$ (i.e., $f2=n \times f_{PWM}-m \times f_{RES}$ where n=1, 2, . . . , m=1, 2, . . . ) can be reliably set to be 0 Hz, or the difference f1 or f2 can be reliably set to be an integral multiple of the exciting frequency $f_{RES}$. Thus, the outputs from the R/D conversion section and brushless motor present no substantial variation, so that variation-free steering assist force can be applied to the steering wheel. As a result, the present invention can afford a smooth steering feel.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
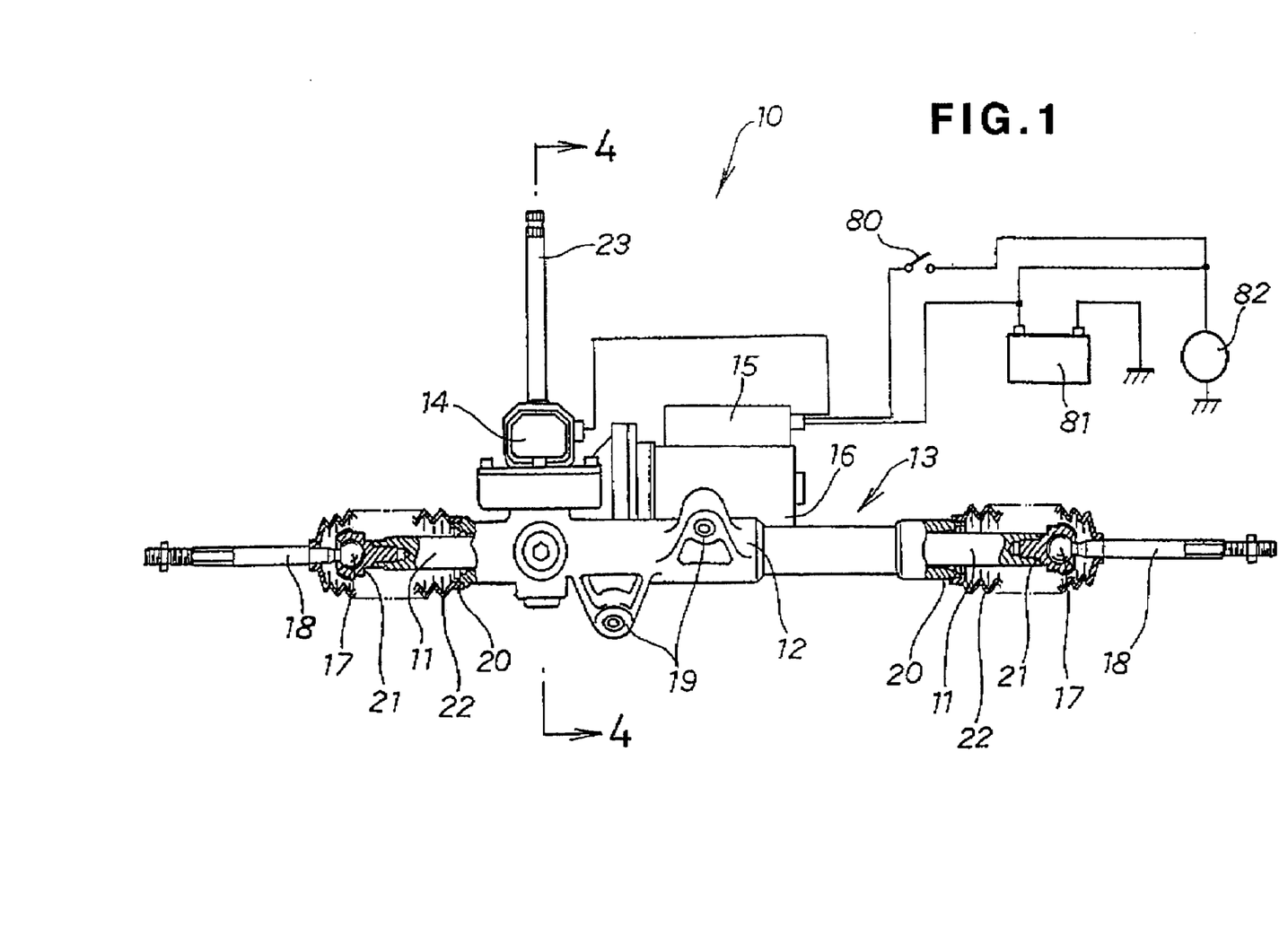
FIG. 1 is a view schematically showing a general construction of an electric power steering apparatus in accordance with an embodiment of the present invention.

Initial reference is made to FIG. 1 schematically showing a general construction of an electric power steering apparatus in accordance with an embodiment of the present invention, where left and right end portions of the steering apparatus are shown in section. In FIG. 1, the electric power steering apparatus 10, suitable for use in a motor vehicle, includes a rack shaft 11 received in a housing 12, extending in a widthwise direction (in the figure, left-and-right direction) of the vehicle, for axial sliding movement along the housing 12. The electric power steering apparatus 10 also includes a gearbox 13, a steering torque detector section 14, a motor controller unit 15, and a brushless motor 16. Ball joints 17 are secured, via screws, to opposite longitudinal end portions of the rack shaft 11 projecting from opposite ends of the housing 12, and left and right tie rods 18 are connected to these ball joints 17. The housing 12 has brackets 19 via which it is attached to a vehicle body (not shown), and stoppers 20 on its longitudinal opposite ends. Reference numeral 80 represents an ignition switch, 82 a battery, and 82 an A.C. generator (A.C.G.).

As the rack shaft 11 slides rightward a predetermined amount, a left abutting surface 21 of the left ball joint 17 (i.e., left rack end) abuts against the left stopper 20 of the housing 12. Similarly, as the rack shaft 11 slides leftward a predetermined amount, a right abutting surface 21 of the right ball joint 17 (i.e., right rack end) abuts against the right stopper 20 of the housing 12. By thus restricting the axial sliding movement of the rack shaft 11, it is possible to limit a maximum steering angle of left and right steered wheels (not shown) of the vehicle. Namely, when the rack shaft 11 slides to either of the left and right extreme ends of its movable range, the steering angle of the left and right steered wheels reaches the maximum. Further, in FIG. 1, reference numeral 22 represents a dust boot.

Figure 2:
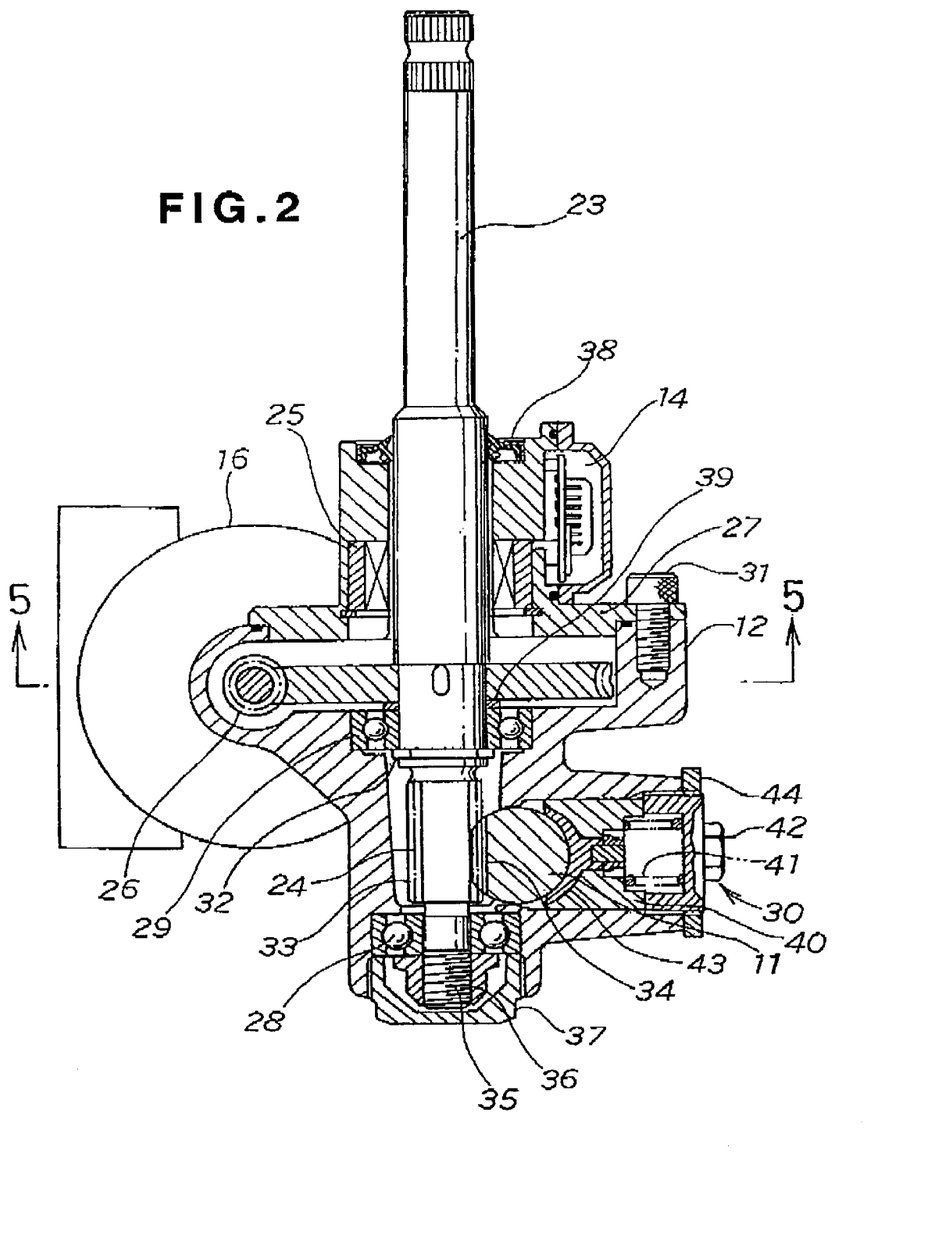
FIG. 2 is a sectional view taken along the 4—4 lines of FIG. 2.

FIG. 2 is a sectional view taken along the 4—4 line of FIG. 1, which shows a vertical sectional construction of the electric power steering apparatus 10. In the power steering apparatus 10, the housing 12 has accommodated therein an input shaft 23, rack-and-pinion mechanism 24, steering torque sensor 25, torque limiter and gear-operated speed reduction mechanism 26, and the housing 12 has its upper end opening closed by a lid 27. The steering torque sensor 25 is attached to the housing 12 or lid 27.

The housing 12 rotatably supports therein a lower end portion and longitudinally-middle portions of the input shaft 23 by means of a pair of upper and lower bearings 28 and 29 in such a manner that the input shaft 23 extends in a vertical direction of the vehicle, and the housing 12 includes a rack guide 30. Reference numeral 31 is a lid-attaching bolt, and 32 represents a stop ring.

Pinion 33 and rack 34 are each plastically formed, such as by casting or rolling. Specifically, the input shaft 23 has the pinion 33 integrally formed on its lower end portion, and a threaded portion 35 at its lower end. The input shaft 23 also has an upper end portion projecting upwardly beyond the lid 27. The rack 34 is integrally formed on the rack shaft 11. With a nut 36 screwed on the threaded portion 35 of the input shaft 23, longitudinal (axial) movement of the input shaft 23 can be restricted. Reference numeral 37 represents a cap nut, 38 an oil seal, 39 a spacer.

The rack guide 30 has a guide portion 40 that contacts a side surface of the rack shaft 11 opposite the rack 34, and an adjusting bolt 42 pressed against the guide portion 40 via compression spring (adjusting spring) 41. The thus-arranged rack guide 30 can press the rack 34 against the pinion 33 by the adjusting bolt 42, screwed into the housing 12, pressing the guide portion 40 via the compression spring 41 with an appropriate force so that the guide portion 40 applies pressure to the rack 34. Reference numeral 43 represents a slide guide member along which the rear surface of the rack shaft 11 slides, and 44 represents a lock nut.

Figure 3:
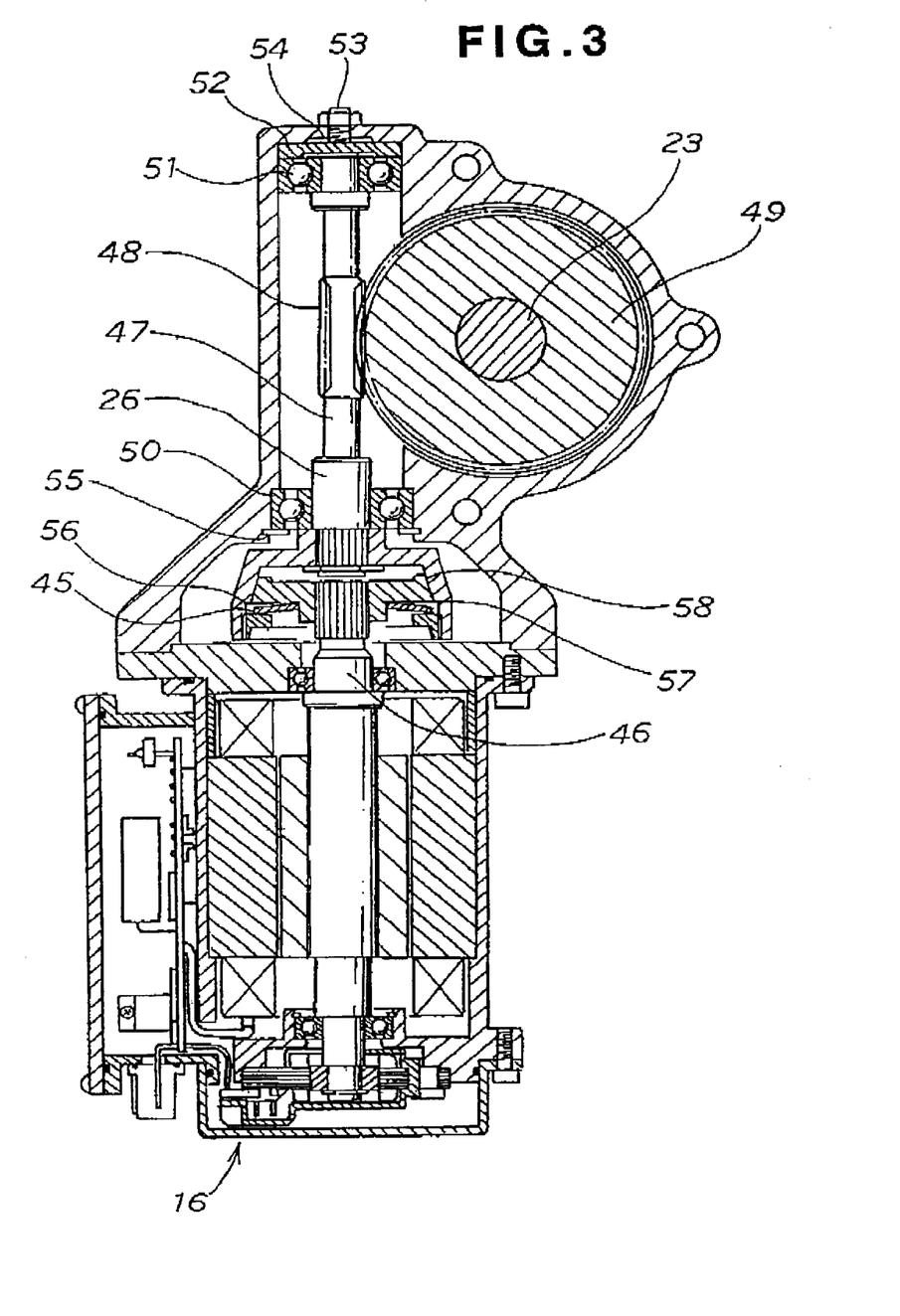
FIG. 3 is a sectional view taken along the 5—5 lines of FIG. 2.

FIG. 3 is a sectional view taken along the 5—5 lines of FIG. 2, which shows relationships among the above-mentioned input shaft 23, brushless motor 16, torque limiter 45 and gear-operated speed reduction mechanism 26. The motor 16 is secured to the housing 12 with its output shaft 46 extending horizontally in the housing 12.

The gear-operated speed reduction mechanism 26 is in the form of a worm gear mechanism, comprising a combination of a driving gear and driven gear, which transmits a steering torque assist generated by the brushless motor 16 to the input shaft 23. Specifically, the speed reduction mechanism 26 includes a transmission shaft 47 connected via the torque limiter 45 to the output shaft 46 of the brushless motor 16, worm 48 formed on the transmission shaft 47, and worm wheel 49 meshing with the worm 48 and operatively connected to the input shaft 23. With the speed reduction mechanism 26 thus constructed, the steering torque assist generated by the motor 16 can be transmitted to the rack-and-pinion mechanism via the input shaft 23.

The transmission shaft 47, which is disposed concentrically with the output shaft 46, is rotatably supported by the housing 12 by means of two bearings 50 and 51. The first bearings 50 located close to the output shaft 46 are fitted on the housing 12 for axial movement along the housing 12, and the second bearings 51 located farther from the output shaft 46 are also fitted on the housing 12 for axial movement along the housing 12. Further, the second bearings 51 have an outer race normally biased by the adjusting bolt 53 axially toward the output shaft 46 via a disk-shaped leaf spring 52. With the adjusting bolt 53 and leaf spring 52 normally biasing the second bearings 51 to thereby impart pressure to the first and second bearings 50 and 51, the transmission shaft 47 can be adjusted so as to have no axial play, i.e. axial rattle or shakes. Besides, by adjusting axial displacement of the worm 48, the meshing engagement between the worm 48 and the worm wheel 49 can be adjusted so as not to rattle or shake while maintaining appropriate friction. Further, the resiliency of the leaf spring 52 can compensate for axial thermal expansion etc. of the transmission shaft 47. Reference numeral 47 represents a lock nut, and 55 represents a stop ring.

In FIGS. 2 and 3, the input shaft 23 to the gearbox 13 is rotatably supported via the bearings 28 and 29 and rotatably connected to a steering wheel (not shown) via a universal joint, column shaft, etc. Rotation of the input shaft 23 caused by the steering wheel is converted into axial displacement of the rack shaft 11 via the pinion gear 24 and rack gear 34, and the axial displacement of the rack shaft 11 causes steerable front wheals (not shown) to pivot horizontally by way of the tie rods 18 to thereby effect steering of the vehicle.

The worm wheel 49 is seed to a portion of the input shaft 23 above the pinion gear 24. As shown in FIG. 3, the worm wheel 49 meshes with the worm gear 48 rotatably supported via the bearings 50 and 51.

The input shaft 23 has a serration 56 formed on its inner peripheral surface, and this serration 56 meshes with a serration formed on the outer peripheral surface of the output shaft 46 of the brushless motor 16 so that the output of the brushless motor 16 is transmitted via a clutch 58 to the worm gear 48.

Figure 4:
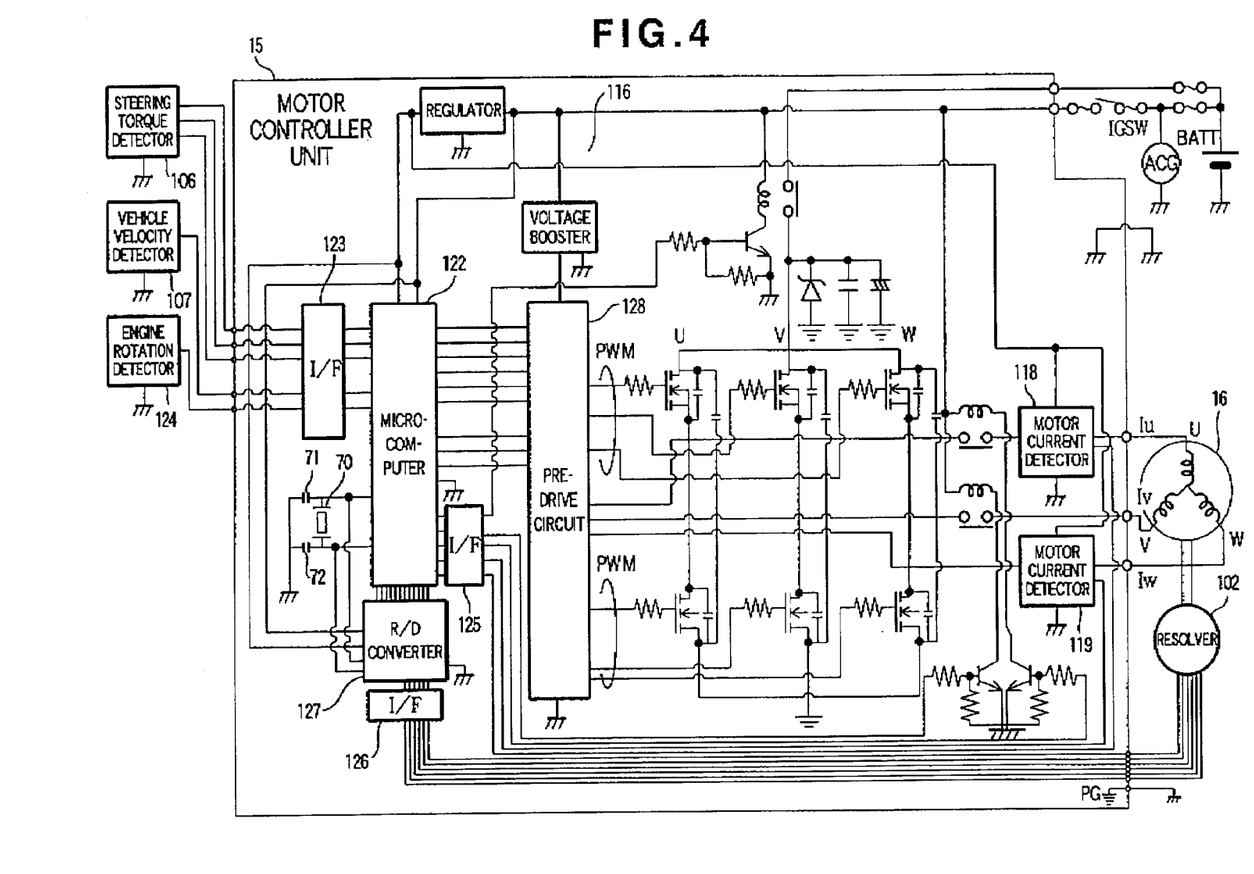
FIG. 4 is a block diagram showing a general setup of a motor controller unit employed in the electric power steering apparatus of FIG. 1.

Basically, the motor controller unit 15 in the instant embodiment is similar to the conventional motor controller unit described earlier in relation to FIGS. 5 and 6. FIG. 4 is a block diagram showing a general setup of the motor controller unit 15. As shown, the motor controller unit 15 includes a one-chip microcomputer and peripheral circuits associated therewith, pre-drive circuit, FET bridge, current sensor, relay, R/D converter, etc. In FIG. 4, the same elements as employed in the conventional motor controller unit are denoted by the same reference characters as in FIG. 6. All the components, except for the various sensors and inverter circuit, are incorporated in an electronic circuitry unit and implemented by a microcomputer 122, and the respective functions of the components are performed by processing based on software programs. By contrast to the conventional motor controller unit employing two crystal oscillators respectively connected to the microcomputer and R/D converter, the motor controller unit 15 in the instant embodiment employs one crystal oscillator connected to both the microcomputer 122 and R/D converter 127 so that the microcomputer 122 and R/D converter 127 share output signals of the same crystal oscillator.

In FIG. 4, an interface circuit 123 includes an A/D converter that converts, into digital representation, a steering torque signal T from a steering torque detector section 106, vehicle velocity signal v from a vehicle velocity detector section 107 and engine rotation signal r from an engine rotation detector section 124. The digital signals thus converted by the interface circuit 123 are passed to the microcomputer 122.

Another interface circuit 125 converts, into digital representation, exciting currents Iu and Iw detected by motor current detector sections 118 and 119 and delivers the thus-converted digital signals to the microcomputer 122. Still another interface circuit 126 passes an exciting current from the R/D converter 127 to a VR-type resolver 102 and an output signal of the resolver 102 to the R/D converter 127. As will be described later, the R/D converter 127 generates an angle signal on the basis of the output signal of the resolver 102 and sends the thus-generated angle signal to the microcomputer 122. Motor drive section 116 includes a pre-drive circuit 128 and an inverter circuit having six power FETs.

External crystal oscillator 70 and capacitors 71 and 72 are connected to the microcomputer 122, and the microcomputer 122 divides an oscillation frequency of the crystal oscillator 70 to generate a frequency $f_{PWM}$ of PWM signals for driving the brushless motor 16 (PWM driving frequency $f_{PWM}$).

Further, the crystal oscillator 70 and capacitors 71 and 72 are also connected to the R/D converter 127 in parallel relation to the microcomputer 122, and the R/D converter 127 divides the oscillation frequency of the crystal oscillator 70 to generate a frequency $f_{RES}$ of exciting signals of the VR-type resolver 102 (exciting frequency $f_{RES}$).

Now, a description will be made about operation or behavior of the instant embodiment. Steering torque applied by a human operator or driver to the steering wheel is detected by the steering torque detector section 106, and a steering torque signal thus generated by the detector section 106 is supplied to the motor controller unit 15. The motor controller unit 15 calculates target motor currents (i e., final d-axis and q-axis target currents Id* and Iq*) on the basis of the steering torque signal from the steering torque detector section 106, vehicle velocity signal, etc.

Then, a PWM duty cycle for driving the brushless motor 16 is calculated on the basis of the target motor currents, motor driving currents Iu and Iw generated by the motor current detector sections 118 and 119 and motor rotational angle signal generated by a rotational angle detector section. Then, vector control is performed by applying sine-wave currents (driving currents Iu, Iv and Iw) to the respective windings of the brushless motor 16 via the pre-drive circuit 128 and FET bridge of the motor drive section 116. The motor current detector sections 118 and 119 each comprise the VR-type resolver 102, R/D converter 127 and peripheral circuits associated therewith.

Frequency of PWM signals for driving the brushless motor 101 (PWM driving frequency), which is beyond the audible range, is generated by the microcomputer 122 dividing the oscillation frequency of the crystal oscillator 70 connected to the microcomputer 122. The same crystal oscillator 70 is also connected to the R/D converter 127, constituting part of the rotational angle detector section, in parallel relation to the microcomputer 122, and the exciting frequency of the VR-type resolver 102 is generated by the R/D converter 127 dividing the oscillation frequency of the crystal oscillator 70.

In the instant embodiment, the PWM driving frequency $f_{PWM}$ is set at 20 kHz while the exciting frequency $f_{RES}$ of the resolver 102 is set at 10 kHz. However, because these frequencies $f_{PWM}$ and $f_{RES}$ are created on the basis of the output signals of the same crystal oscillator circuit, the PWM driving frequency $f_{PWM}$ can be set to be exactly an integral multiple of the exciting frequency $f_{RES}$. Therefore, the difference between the PWM driving frequency $f_{PWM}$ and the exciting frequency $f_{RES}$ (f1=$f_{PWM}$-$f_{RES}$) can be exactly 10 Hz that is identical with the exciting frequency $f_{RES}$. Further, the difference between the respective harmonics (higher-order frequency components) of the PWM driving frequency $f_{PWM}$ and the exciting frequency $f_{RES}$ (f2=n× $f_{PWM}$-m× $f_{RES}$ where n=1, 2, . . . , m=1, 2, . . . ) can be 0 Hz, or identical with or an integral multiple of the exciting frequency $f_{RES}$. Therefore, there will not be caused variations in synchronized detection signals sin(θ−φ) generated by a synchronized detector section (similar to the synchronized detector section 138 of FIG. 8) during the R/D conversion by the R/D converter 127, so that variations corresponding to the frequency difference f1 or f2 will not appear in the outputs of the R/D converter 127. Consequently, the arrangements of the instant embodiment can reliably prevent undesired variations in the outputs of the brushless motor 16. As a result, the present invention can provide an electric power steering apparatus which can afford a smooth steering feel with a steering torque assist having no low-frequency variations.

In the above-described embodiment of the present invention, the single crystal oscillator 70 is connected to both of the microcomputer 122 and R/D converter 127 in a parallel fashion, so that the same clock frequency is shared between the microcomputer 122 and the R/D converter 127 to allow the PWM driving frequency to be an integral multiple of the exciting frequency of the resolver. Alternatively, the crystal oscillator 70 may be connected only to the microcomputer 122, and clock signals output from the oscillator 70 may be sent from the microcomputer 122 to the R/D converter 127 so that the PWM driving frequency can be set to an integral multiple of the exciting frequency of the resolver. In another alternative, the crystal oscillator 70 may be connected only to the R/D converter 127, and clock signals output from the oscillator 70 may be sent from the R/D converter 127 to the microcomputer 122 so that the PWM driving frequency can be set to an integral multiple of the exciting frequency of the resolver.

As apparent from the foregoing, the present invention achieves the following benefits.

Namely, because one of the predetermined PWM driving frequency at which the brushless motor is driven and the predetermined exciting frequency of the resolver is set to be an integral multiple of the other, the difference between the PWM driving frequency $f_{PWM}$ and the exciting frequency $f_{RES}$ (i.e., f1=$f_{PWM}$-$f_{RES}$) or the difference between respective higher-order frequency components of the PWM driving frequency $f_{PWM}$ and the exciting frequency $f_{RES}$ (i.e., f2=n× $f_{PWM}$-m× $f_{RES}$) can be 0 Hz, or the difference f1 or f2 can be an integral multiple of the exciting frequency $f_{RES}$. Thus, the outputs from the brushless motor present no substantial variation, so that variation-free steering assist force can be applied to the steering wheel. As a result, the present invention can afford a smooth steering feel.

Particularly, because both the PWM driving of said brushless motor and the excitation of said resolver are performed in accordance with the output signals of the same oscillator in such a manner that one of the predetermined PWM driving frequency and the predetermined exciting frequency of the resolver is set to be an integral multiple of the other of the predetermined PWM driving frequency and the predetermined exciting frequency, the present invention can afford a smooth steering feel.

The present disclosure relates to the subject matter of Japanese Patent Application No. 2002-065874 filed on Mar. 11, 2002, the disclosure of which is expressly incorporated herein by reference in its entirety.

What is claimed is:

1. An electric power steering apparatus comprising:

a steering torque detector section for detecting steering torque applied to a steering wheel;

a motor for imparting a steering torque assist to a steering system, said motor being a brushless motor;

a rotational angle detector section for detecting a rotational angle of said brushless motor, said rotational angle detector section including a resolver;

a motor current detector section for detecting a current supplied to said brushless motor; and a motor controller unit for controlling PWM driving of said brushless motor at a predetermined PWM driving frequency, on the basis of output signals of at least said steering torque detector section, said rotational angle detector section and said motor current detector section, wherein one of the predetermined PWM driving frequency and a predetermined exciting frequency of said resolver is set to be an integral multiple of other of the predetermined PWM driving frequency and the predetermined exciting frequency.

2. An electric power steering apparatus as claimed in claim 1 wherein both the PWM driving of said brushless motor and excitation of said resolver are performed in accordance with output signals of a same oscillator in such a manner that one of the predetermined PWM driving frequency and the predetermined exciting frequency of said resolver is set to be an integral multiple of other of the predetermined PWM driving frequency and the predetermined exciting frequency.

* * * * *